US008095545B2

(12) United States Patent
Telloli et al.

(10) Patent No.: US 8,095,545 B2
(45) Date of Patent: Jan. 10, 2012

(54) SYSTEM AND METHODOLOGY FOR A MULTI-SITE SEARCH ENGINE

(75) Inventors: Luca Telloli, Catalunya (ES); Flavio Junqueria, Catalunya (ES); Aristides Gionis, Catalunya (ES); Vassilis Plachouras, Catalunya (ES); Ricardo Baeza-Yates, Catalunya (ES)

(73) Assignee: Yahoo! Inc., Sunnyvale, CA (US)

( * ) Notice: Subject to any disclaimer, the term of this patent is extended or adjusted under 35 U.S.C. 154(b) by 587 days.

(21) Appl. No.: 12/250,929

(22) Filed: Oct. 14, 2008

(65) Prior Publication Data
US 2010/0094853 A1    Apr. 15, 2010

(51) Int. Cl.
*G06F 7/02* (2006.01)
(52) U.S. Cl. .......................................... 707/750; 707/758
(58) Field of Classification Search .................. 707/706, 707/750, 758
See application file for complete search history.

(56) References Cited

U.S. PATENT DOCUMENTS

| | | | |
|---|---|---|---|
| 6,804,665 | B2 | 10/2004 | Kreulen et al. |
| 6,910,037 | B2 | 6/2005 | Gutta et al. |
| 7,024,400 | B2 | 4/2006 | Tokuda et al. |
| 7,499,934 | B2 | 3/2009 | Zhang et al. |
| 7,725,465 | B2 * | 5/2010 | Liao et al. ...................... 707/728 |
| 7,844,590 | B1 * | 11/2010 | Zwicky et al. ................. 707/706 |
| 2005/0060312 | A1 | 3/2005 | Curtiss et al. |
| 2005/0165753 | A1 | 7/2005 | Chen et al. |
| 2006/0136411 | A1 * | 6/2006 | Meyerzon et al. ................ 707/5 |
| 2006/0161534 | A1 | 7/2006 | Carson, Jr. et al. |
| 2006/0271536 | A1 | 11/2006 | Zhang et al. |
| 2006/0294101 | A1 | 12/2006 | Wnek |
| 2008/0165727 | A1 * | 7/2008 | Xiaoben et al. ................ 370/329 |
| 2010/0036784 | A1 * | 2/2010 | Mishne et al. ................... 706/45 |
| 2010/0131495 | A1 * | 5/2010 | Murdock et al. .............. 707/722 |

OTHER PUBLICATIONS

International Searching Authority, "Notification of Transmittal of the International Search Report and the Written Opinion of the International Searching Authority, or the Declaration," Jun. 8, 2010, Application No. PCT/US2009/059624, 11 pages.

(Continued)

*Primary Examiner* — James Trujillo
*Assistant Examiner* — Soheila Davanlou
(74) *Attorney, Agent, or Firm* — Hickman Palermo Truong & Becker LLP; Adam C. Stone

(57) ABSTRACT

Techniques for query processing in a multi-site search engine are described. During an indexing phase, each site of a multi-site search engine indexes a set of assigned web resources and each site calculates, for each term in the set of assigned web resources, a site-specific upper bound ranking score on the contribution of the term to the search engine ranking function for a query containing the term. During a propagation phase, all sites exchange their site-specific upper bound ranking scores with each other. In response to a site receiving a query, the site determines the set of locally matching resources and compares the ranking score of a locally matching resource with the site-specific upper bound ranking scores for the terms of the query that were received during the propagation phase and determines whether to communicate the query to other sites. By exchanging appropriately defined site-specific upper bound ranking scores, the site initially receiving the query can determine whether the locally matching resources would be identical to the resources obtained from a single-site search system without having to communicate the query to each of the other sites.

31 Claims, 6 Drawing Sheets

OTHER PUBLICATIONS

"Current claims from PCT application as filed," Application No. PCT/US2009/059624, 4 pages.

Baeza-Yates, Ricardo et al., "Challenges on Distributed Web Retrieval", Yahoo Reasearch Barcelona, Chile, Apr. 2007, ISBN: 1-4244-0803-2, 16 pages.

Baeza-Yates, Ricardo et al., "The Impact of Caching on Search Engines", SIGIR 2007 Proceedings, Session 8: Managing Memory, ACM 2007, 8 pages.

Barroso, Luiz Andre, et al., "Web Search for a Planet: The Google Cluster Architecture", Google, IEEE Computer Society, 2003, 7 pages.

Bender, Matthias, et al., "Design Alternatives for Large-Scale Web Search: Alexander was Great, Aeneas a Pioneer, and Anakin has the Force", ACM, SIGIR Workshop on Large Scale Distributed Systems for Information, 2007, 7 pages.

Brewer, Eric A., Lessons from Giant-Scale Services, IEEE Computer, Aug. 2001, 10 pages.

Brin, Sergey, et al., "The Anatomy of a Large-Scale Hypertextual Web Search Engine", Computer Networks and ISDN Systems, vol. 30, Issue 1-7, ISSN: 0169-7552, Apr. 1998, 20 pages.

Callan, Jamie, "Distributed Information Retrieval", Advances in Information Retrieval, 2000, 24 pages.

Callan, James P., et al., "Searching Distributed Collections With Inference Networks", Association for Computing Machinery, 1995, 8 pages.

Cardwell, Neal, et al., "Modeling TCP Latency", INFOCOM 2000, Nineteenth Annual Joint Conference of the IEEE Communications Societies, vol. 3, Mar. 2000, 10 pages.

Cho, Junghoo, et al., "Parallel Crawlers", WWW 2002, ACM, 13 pages.

American Power Conversion, "Determining Total Cost of Ownership for Data Center and Network Room Infrastructure", White Paper #6, 2003, 9 pages.

Badue, C.S., et al., "Analyzing imbalance among homogeneous index servers in a web search system", Information Processing and Management, An international journal, vol. 43, Issue 3, May 2007, ISSN 0306-4573, Elsevier Ltd., 18 pages.

Li, Jinyang, et al., "On the feasibility of Peer-to-Peer Web Indexing and Search", Peer to Peer Systems II, vol. 2735/2003, ISSN# 0302-9743 (print), Springer Berlin/ Heidelberg, 2003, 6 pages.

Moffat, Alistair, et al., "A Pipelined Architecture for Distributed Text Query Evaluation", Information Retrieval, vol. 10, Issue 3, Jun. 2007, ISSN: 1386-4564, 28 pages.

Ntoulas, Alexandros, et al., "Pruning Policies for Two-Tiered Inverted Index with Correctness Guarantee", SIGIR 2007 Proceedings, Session 8: Managing Memory, Copyright 1007 ACM, 8 pages.

Orlando, S., "Design of a Parallel and Distributed Web Search Engine", In Proceedings of Parallel Computing (ParCo) 2001 conference, Imperial, 2001, 8 pages.

Risvik, Knut Magne, et al., "Multi-tier Architecture for Web Search Engines", Proceedings of the 15th Symposium on Computer Architecture and High Performance Computing, IEEE, 2003, 12 pages.

Tomasic, Anthony, et al., "Query Processing and Inverted Indices in Shared-Nothing Text Document Information Retrieval Systems", Appears in the VLDB Journal (2) 3, Jan. 17, 1994, 27 pages.

Zhang, Jiangong, et al., "Efficient Query Evaluation on Large Textual Collections in a Peer-to-Peer Environment", Proceedings of the fifth IEEE international conference on peer-to-peer computing, 2005, 9 pages.

Exposto, Jose, et al., "Geographical Partition for Distributed Web Crawling", GIR 2005, Copyright ACM, Nov. 2005, 6 pages.

Fagni, Tiziano, et al., "Boosting the Performance of Web Search Engines: Caching and Prefetching Query Results by Exploiting Historical Usage Data", ACM Transactions on Information Systems, vol. 24, No. 1, Jan. 2006, 28 pages.

Fan, Xiaobo, et al., "Power Provisioning for a Warehouse-sized Computer", In Proceedings of the ACM International Symposium on Computer Architecture, Jun. 2007, 11 pages.

Garcia, Steven, et al., "Access-Ordered Indexes", Australian Computer Society, Inc., 2004, 8 pages.

Heydon Allan, et al., "Mercator: A Scalable, Extensible Web Crawler", Compaq Systems Research Center, 1999, 15 pages.

Joachims, Thorsten, et al., "Accurately Interpreting Clickthrough Data as Implicit Feedback", SIGIR 2005, Aug. 2005, Copyright ACM, 8 pages.

Melnik, Sergey, et al., "Building a Distributed Full-Text Index for the Web", Published in ACM Transactions on Information Systems (TOIS), vol. 19, No. 3, 2001, 25 pages.

Moffat, Alistair, et al., "Load Balancing for Term-Distributed Parallel Retrieval", SIGIR 2006, Copyright ACM 2006, 8 pages.

Shkapenyuk, Vladislav, et al., "Design and Implementation of a High-Performance Distributed Web Crawler", In Proceedings of the International Conference on Data Engineering, 2002, 22 pages.

Si, Luo, et al., "Relevant Document Distribution Estimation Method for Resource Selection", SIGIR 2003, Copyright ACM 2003, 8 pages.

Turner IV, W. Pitt, et al., "Tier Classifications Define Site Infrastructure Performance", The Uptime Institute, Tier Classifications Define Site Infrastructure Performance, White Paper, retrieved from internet: < http://www.upsite.com/file_downloads/PDF/Tier_Classification.pdf >, Retrieved on Jul. 20, 2009, 17 pages.

Saraiva, Patricia Correia, et al., "Rank-Preserving Two-Level Caching for Scalable Search Engines", SIGIR 2001, Sep. 2001, Copyright 2001 ACM, 8 pages.

Baeza-Yates, R. et al., "Modern Informational Retrieval" Addison Wesley, May 1999 (38 pages).

Craswell, N. et al., "Relevance weighting for query independence evidence" In SIGIR '05: Proceedings of the 28th annual international ACM SIGIR conference on Research and Development in information retrieval, 2005 (8 pages).

Lee, H. et al., "IRLbot: scaling to 6 billion pages and beyond," In Proceedings of the 17th World Wide Web Conference, 2008, Abstract (2 pages).

Lempel, R. et al., "Predictive cashing and prefetching of query results in search engines," In WWW '03 Proceedings of the 12th International conference on World Wide Web, New York, NY, USA ACM Press, 2003, Abstract (2 pages).

* cited by examiner

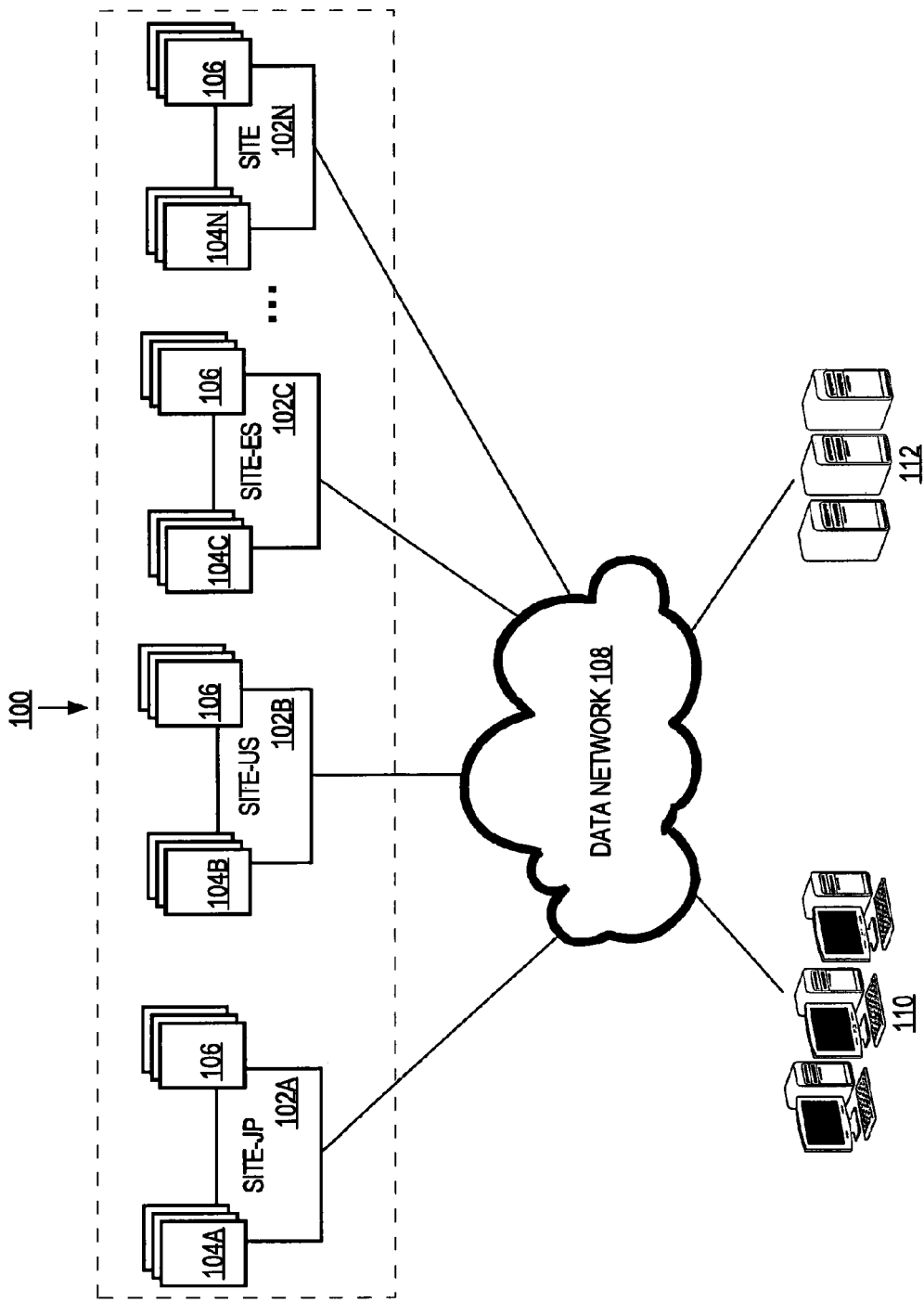

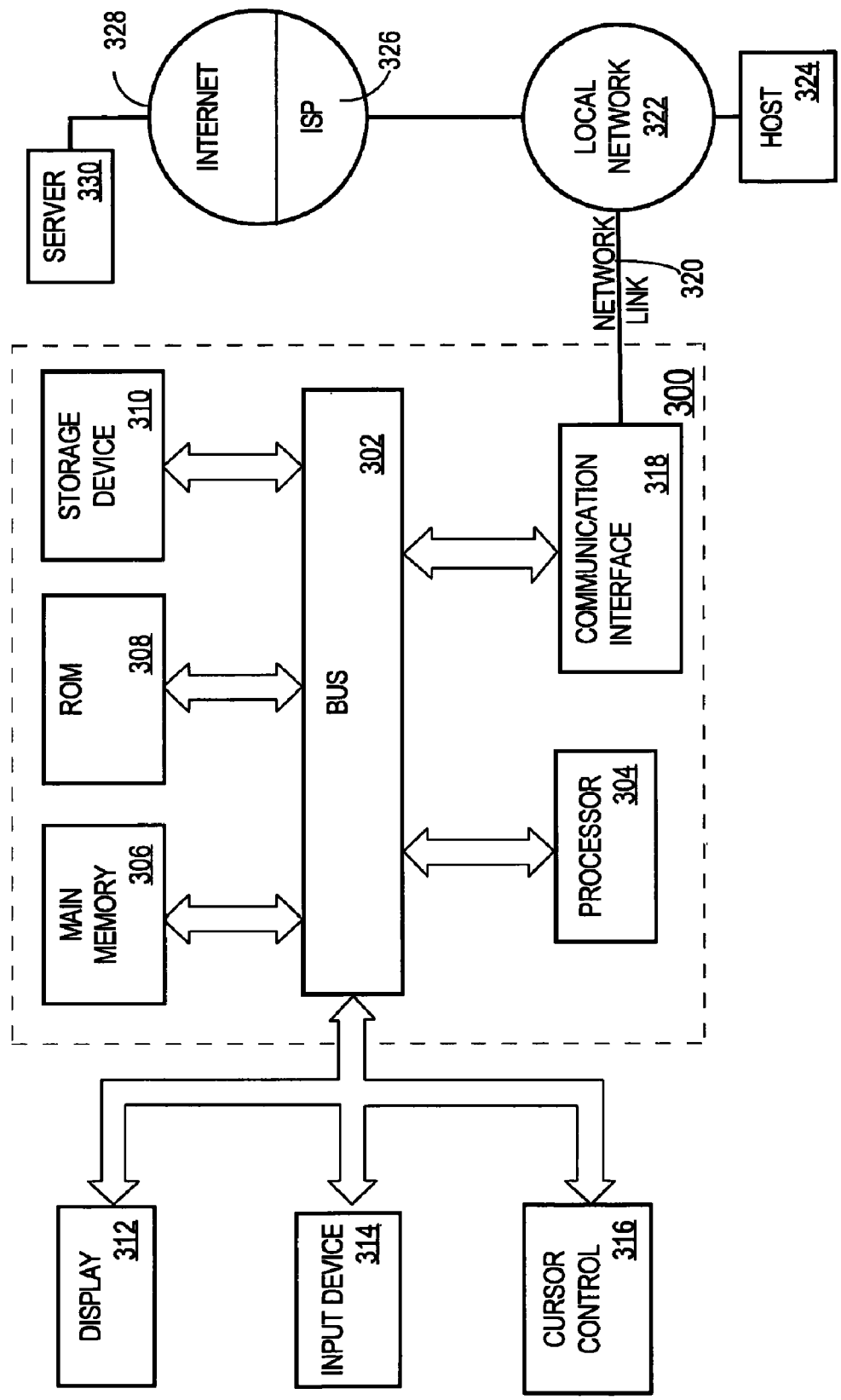

SYSTEM AND METHODOLOGY FOR A MULTI-SITE SEARCH ENGINE

FIELD OF THE INVENTION

The present invention relates generally to informational retrieval systems. More particularly, the present invention relates to query processing in multi-site search engines.

BACKGROUND

Through the use of the Internet and the World Wide Web ("the web"), individuals have access to billions of items of information. For example, the web provides access to items such as web pages, documents, images, e-mail messages, instant messaging messages, music, videos, etc., generally and collectively referred to herein as "searchable resources" or simply "resources." However, a significant drawback with using the web is that, because there is so little organization to the web, at times it can be extremely difficult for users to locate the particular resources that contain the information that is of interest to them. To address this problem, a mechanism known as a "search engine" has been developed to index a large number of resources and to provide an interface that can be used to search the indexed information by entering certain words or phases to be queried. A search engine is a computer program designed to find resources stored in a computer system, such as the web or such as a user's desktop computer. The search engine's tasks typically include finding and analyzing resources ("crawling"), building a search index that supports efficient retrieval of crawled resources ("indexing"), and processing queries for information by using the search index to retrieve relevant resources ("query processing").

With the explosive growth of resources available on the web, search engines require substantial computing resources in order to perform the tasks of crawling, indexing, and query processing. Often, largely for economic reasons, a search engine is deployed at a single-site, that is, at a single geographic location such as at a single data center with hundreds or even thousands of server computers for performing search engine tasks. A data center is a physical facility used to house server computer systems and associated components, such as telecommunications and storage systems. For a single-site search engine, the site of the search engine is often selected based on the cost of land, labor, and services, in particular electricity that is associated with establishing a data center at the selected site.

However, single site search engines suffer drawbacks that result from their singular locality. For example, since resources on the web are dispersed throughout the world, the task of crawling the web for resources from a single site is significantly affected by the geographic distances between the site and the computers containing the resources. This is because, in general, network connection time increases and data transfer rates decreases as the geographic distance between the connection endpoints increases. Thus, more servers are needed by a single-site search engine to perform the same crawling as the geographic distances between the site and the resources increases. Similarly, since queries for information may be sent to a search engine from computers all over the word, more servers at the single-site search engine are needed to handle the same query volume as the geographic distances between the querier and the site increases.

One solution to improve the performance of a single-site search engine is to distribute the search engine across multiple, geographically dispersed sites so that search sites are closer to the resources they crawl and the queriers for which they process queries. However, it is difficult to distribute the search engine in a manner that maximizes the number of queries answered locally, that is, without the site receiving the query having to communicate with another site to answer the query, while at the same time not sacrificing the quality of results that would be returned from a single-site search engine.

An example of a multi-site search engine architecture is a hub and spoke topology in which at most only two connections are needed if a query cannot be answered locally (i.e., one connection from the site receiving the query to the hub site and a second connection from the hub site to a spoke site that can answer the query). A hub and spoke topology suffers from a significant drawback however, namely, having to provision a hub site in such a way that it can handle more traffic compared to the spoke sites. As a result, a hub and spoke topology can be more costly than the single-site search engine it was designed to replace.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating an exemplary multi-site search engine in which embodiments of the invention may be implemented.

FIG. 3 is a block diagram that illustrates a computing device upon which an embodiment of the invention may be implemented.

DETAILED DESCRIPTION

Figure 2A:
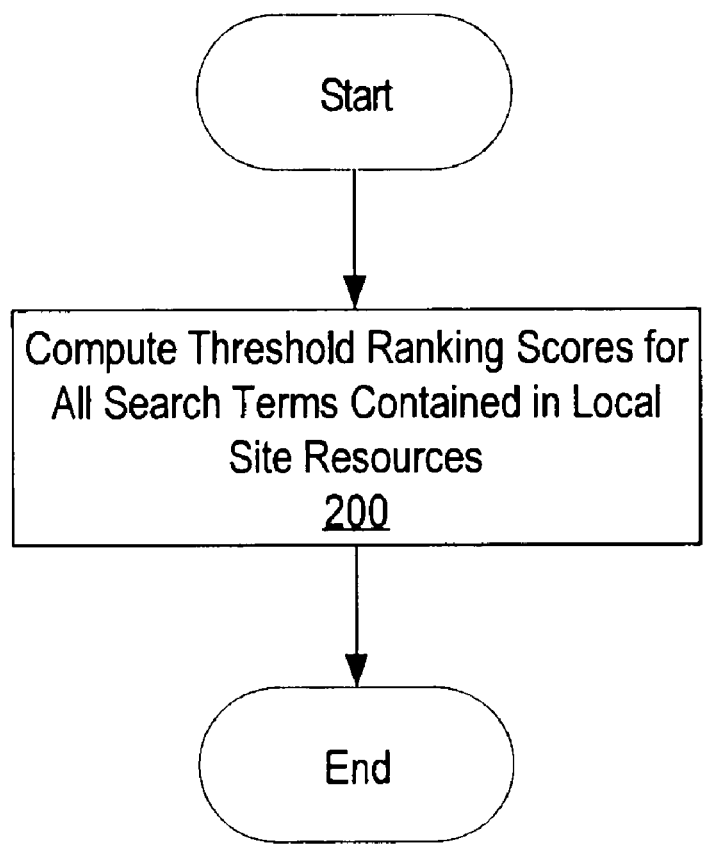
FIG. 2A is a flowchart illustrating exemplary steps for an indexing phase of processing a query in a multi-site search engine according to one or more embodiments of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Definitions

The following definitions apply to terminology used herein.

A "querier" refers to a user and/or computing process that formulates and submits a query containing one or more search terms to a search engine.

A "search term" refers to a word, phrase, and/or keyword that may be input by a querier into an interface provided by a search engine and used by the search engine to search for indexed resources that contain a word, phrase, and/or keyword that matches the search term. Thus, search term, in addition to referring to a word, phase, and/or keyword input by a querier, also refers to a word, phrase, and/or keyword contained in any resource indexed by a search engine such as, for example, a web page, a document, etc. Additionally, "search term," as used herein, includes any stemmed variants thereof and equivalent spellings and acronyms.

Overview

Techniques are described herein for provisioning a multi-site search engine in such a way that the search engine is able to process locally a significant fraction of all queries without sacrificing the quality of search results while at the same time being cost competitive with single-site search engines. In an index construction phase, each site of the multi-site search engine builds an index of a set of local resources assigned to the site. In addition to building the index, each site computes a numeric value, referred to herein as a "threshold ranking score," for each search term contained in the set of local resources assigned to the site ("local site resources"). As explained in greater detail below, the threshold ranking score represents a site-specific upper bound on the contribution of the corresponding search term to the ranking function employed by the search engine for a query that contains the search term.

In a propagation phase, all sites of the multi-site search engine communicate with each other and exchange information about the threshold ranking scores computed during the index construction phase. As a result, each site of the search engine acquires complete information about the threshold ranking scores of all the search terms in all the other sites.

After the index construction phase and the propagation phase, when a site receives a query, the site determines a set of locally matching resources that match the query. The site then ranks the locally matching resources according to the ranking function employed by the search engine. Then the site uses the threshold ranking scores received from the other sites for the terms in the query to determine whether the locally matching resources already ranked are identical to the results that would have been obtained from a single-site search engine.

By using appropriately defined thresholds, a site in the multi-site search engine can obtain guarantees on the quality of the locally matching resources without having to send the received query to each of the other sites. If the guarantees are satisfied, then the query can be answered directly by the site that received the query ("the local site") without any communication with the other sites. If the quality guarantees are not satisfied, then the local site can propagate the query to the other sites in order to obtain results from those sites, and merge the results from the other sites into a single list of results that are returned to the querier. In either case, the results returned to the querier for all queries may be identical to the results that would have been obtained by a single-site search engine that has access to all of the resources to which the multi-site search engine has access.

Exemplary Multi-Site Search Engine

FIG. 1 is a block diagram illustrating an exemplary multi-site search engine 100 in which embodiments of the invention may be implemented. Multi-site search engine 100 includes one or more sites 102A-N all coupled to data network 108. Each site may be associated with a particular geographic region (e.g., a state, country, group of countries, continents, etc.) through that site's location within that region. For example, each of sites 102A, 102B, and 102C are located within a particular country. Site 102A is located in Japan, site 102B is located within the United States, and site 102C is located in Spain.

Each site 102A-N may comprise one or more co-located server computer systems that implement the techniques described herein through any suitable combination of hardware and software. In one embodiment, each site is a data center facility housing one or more server computer systems such as one or more computer systems 300 of FIG. 3 configured with software which when executed by the processors of the server computing systems perform the techniques described herein. In addition to the crawling, indexing, and query processing services described herein, a site may also provide other services in addition to search services such as e-mail services, instant messaging services, and the like.

It is expected, but not required, that sites will be located in geographic regions that are closest to the queriers that will submit queries to the search engine and closest to the resources that the search engine will crawl. However, embodiments of the invention are not limited to any particular geographic region or limited to a particular number of sites. Additionally, the organization of the sites need not be flat, and each site can adopt special roles. For example, the sites may be organized hierarchically such that sites have distinct roles.

In multi-site search engine 100, the sites 102A-N are all coupled to the data network 108. The data network 120 facilitates communications between sites 102A-N. Data network 120 may be any computer network capable of delivering bytes of data, e.g., messages, from one computer, e.g., a server at site 102A, to another computer, e.g., a server at site 102C. The data network 108 may be a wide area network ("WAN") (e.g., the Internet), a telecommunications network, a wireless network, or other functionally equivalent data transfer network system. Further, data network 108 may be comprised of one or more networks that are coupled together to form a single logical network and that supports appropriate network protocols (e.g., TCP/IP for the Internet).

The sites 102A-N of multi-site search engine 100 may be connected to one or more clients 110 through data network 108. A querier may use a client to submit queries to a site and to receive search results from the site. In one embodiment, clients 110 are configured with a web browsing application such as the commercially available Microsoft Internet Explorer browser or the Mozilla Firefox browser. Queriers use the browsing application to submit queries to sites 102A-N and display search results from sites 102A-N.

It is expected, but not required, that clients 110 may be dispersed throughout the world and that each client will submit queries to the site 102A-N that is geographically closest to the client. Various well-known techniques may be used to route a client to the closest site 102A-N. In one embodiment, the Domain Name Service (DNS) server(s) that serve a client return the Internet Protocol (IP) address of the closest site in response to a request from the client to resolve the domain name of the multi-site search engine 100. In another embodiment, each site is configured with a unique domain name that is well-known to queriers near the site. In such an embodiment, the querier uses the well-known domain name to direct the client to the closest site when submitting queries.

The sites 102A-N of multi-site search engine 100 may also be connected to one or more resource servers 112 through data network 108. Resources servers are computer systems containing searchable resources that may be of interest to queriers when submitting queries to search engine 100. Like clients 110, resource servers 112 may be dispersed throughout the world. Sites 102A-N crawl resource servers 112 and create index entries 104A-N that index the resources contained in resource servers 112. In one embodiment, each site is configured to crawl a subset of resource servers 112 that are closest to the site. For example, site 102A may be configured to crawl resource servers 112 that reside within Japan, site 102B may be configured to crawl resource servers 112 that reside within the United States, and site 102C may be configured to crawl resource servers 112 that reside within Spain.

Each of the index entries 104A-N index the resources of the resource servers 112 that the corresponding site is configured to crawl. Thus, each of index entries 104A-N may be considered as indexing a set of resources that are local to the corresponding site ("local site resources"). Continuing the example from above, index entries 104A at site 102A index the resources on the resource servers 112 that reside within Japan, index entries 104B at site 102B index the resources on the resource servers 112 that reside within the United States, and index entries 104C at site 102C index the resources on the resource servers 112 that reside within Spain. Index entries 104A-N may be stored as part of any data structure suitable for indexing resources for use in processing search queries. In one embodiment, each of sites 102A-N stores that site's respective index entries 104A-N in an inverted index data structure.

The index at each site 102A-N may also contain index entries 106 that index the set of globally best resources from resource servers 112. The set of globally best resources are those resources that are most frequently found in the results of all queries across all sites 102A-N. In one embodiment, the set of globally best resources is computed using historical query logs kept at each site 102A-N by the query processing service executing on one or more server computer systems at the site.

For ease of explanation, the term "site resource" will be used hereinafter to refer to a local site resource or a globally best resource that is indexed at the site.

Search Engine Ranking Function

According to one or more embodiments of the invention, each site 102A-N may employ a search engine ranking function, or simply ranking function, to accomplish a variety of tasks, including the ranking of search results. Additionally, as described in greater detail below, these tasks include the computing of threshold ranking scores for search terms and the computing of site-specific upper bound ranking scores with respect to a query for non-local sites. Embodiments of the invention are not limited to any particular ranking function. Described herein are general properties of a ranking function that may be employed by a search engine, such as search engine 100. While specific examples of a ranking function are provided, other functionally equivalent ranking functions may be used within the spirit and scope of the invention. Further, the ranking function may comprise arbitrarily complex functions, such as neural nets and decision trees, and may combine an arbitrary number of features extracted from the resources.

In general, a search engine ranking function takes, as input, a resource and a query. The search engine ranking function assigns a score to the resource based on how relevant the content of the resource is to the search terms of the query. In one embodiment, in response to a query from a querier, the query processing service at each site 102A-N employs the search engine ranking function to assign a ranking score to each site resource that contains all the search terms of the query ("matching site resources"). The matching site resources may be identified using an index of search terms found in the site resources such as, for example, the index of site 102A discussed above containing index entries 104A and index entries 106. After the scores are assigned to the matching site resources, the query processing service orders the scores of the matching site resources from highest to lowest (assuming a higher score indicates a more relevant resource) and returns, as search results, the top-K scoring matching site resources as an answer to the query.

In one embodiment, the score assigned to a resource by the ranking function is a weighted combination of a computed query-independent score and a computed query-dependent score. The query-independent score may be computed using any of a variety well known algorithms for computing the score of a resource independent of the query such as the PageRank™ algorithm, or other link-analysis measures, spam scores, etc. The query-dependent score may be any algorithm that measures the relevance of a resource with respect to a given set of search terms and may combine scores such as, for example, TF/IDF (term frequency—inverse document frequency), Okapi BM25, etc.

Indexing Phase

As discussed previously, the techniques described herein for query processing in a multi-site search engine comprise three phases: an indexing phase, a propagation phase, and a query-processing phase. In the indexing phase, each site 102A-N builds an index on the set of local site resources assigned to the site. In one embodiment, resources are assigned to a site based on the geographical proximity of resource servers 112 to the site. Assignment of a resource to a site may be accomplished by configuring the site with the network address and/or Uniform Resource Locator (URL) of the resource server 112 that hosts the resource. In this manner, a site may be configured to crawl and index resources on a set of resource servers 112.

In addition to building the index, each site computes a threshold ranking score for each search term found in the set of local site resources. In one embodiment, the threshold ranking score for a search term is computed using the search engine ranking function by determining the highest score of a local site resource that contains the search term. This may be accomplished by applying the ranking function to each local site resource that contains the search term and selecting the score of the highest scoring resource as the threshold ranking score for the search term. The threshold ranking score then represents a site-specific upper bound on the contribution of the search term to the search engine ranking function for a query containing the search term.

In embodiments where the search engine ranking function comprises a query-dependent component all sites exchange with each other the information necessary to calculate comparable threshold ranking scores. For example, in one embodiment, when computing a threshold ranking score for a term, each site has information about the frequency of the term in the set of all resources indexed by all sites to ensure that the threshold ranking score calculated at one site is comparable to the threshold ranking score calculated at another site. For example, for ranking functions that score resources based on TF/IDF (term frequency—inverse document frequency), the IDF component is obtained, in part, by dividing the number of all resources by the number of resources containing a particular search term. Thus, in order for a site to calculate comparable threshold ranking scores based on TF/IDF, each site 102A-N in search engine 100 must know, for each search term for which the site is computing a threshold ranking score, the number of all resources indexed at all sites 102A-N and the number of those resources that contain the search term. In one embodiment, any information used in computing comparable threshold ranking scores at a site, such as term frequency information, may be exchanged by all sites prior to computing threshold ranking scores.

Propagation Phase

In the second phase, the propagation phase, all sites 102A-N communicate with each other and exchange information about the threshold ranking scores computed during the indexing phase. As a result, each site acquires complete information about the threshold ranking scores of all the terms in all the other sites. In other words, in the propagation phase, all sites 102A-N exchange information about their threshold ranking scores for all terms in their set of local site resources. That is, each site 102A-N learns the threshold ranking scores for all other sites and all terms in the set of resources indexed at all other sites.

After threshold ranking scores have been exchanged, each site in the search engine is able to process queries in the query-processing phase.

Query-Processing Phase

A local site, during the query-processing phase, upon receiving a query containing one or more search terms, determines the top-k resources in the set of all resources indexed at all sites of the multi-site search engine. Initially, the local site receiving the query computes, using a local index, the set of site resources that contain all search terms of the query. Then, the local site ranks the set of matching site resources according to the search engine ranking function. In the process of ranking the matching site resources, a score for the k-th matching site resource is computed.

Like computing comparable threshold ranking scores, computing comparable ranking scores for matching site resources may involve term frequency information, or other information, from all sites. Thus, in one embodiment, all sites have previously exchanged any information about their site resources to the extent required by the ranking function. Such information may include, for example, term frequency information, that is used by the search engine ranking function to produce comparable ranking scores.

Once the score of k-th matching site resource is obtained, the local site computes locally an upper bound ranking score for each of the other sites ("non-local sites") of the multi-site search engine with respect to the search terms of the query. The upper bound ranking score for a non-local site is an upper bound on the ranking score of any site resource at the non-local site that could be an answer for the query received at the local site. In one embodiment, the upper bound ranking score for a non-local site is computed as the average of the threshold ranking scores for each of the search terms in the query that were received from the non-local site during the indexing phase. In an embodiment, if a non-local site did not send a threshold ranking score during the indexing phase for one or more search terms of the query, then the non-local site is considered by the local site not to contain any resource that could be an answer for the query.

By computing the upper bound ranking scores of all non-local sites with respect to a received query, a local site can test the quality of the top-k matching site resources determined at the local site with the top-k results that would have been obtained from a single-site search engine by comparing the score of the k-th matching site resource against the computed upper bound ranking scores of all non-local sites in the multi-search engine. If the score of the k-th matching site resource is greater than or equal to the upper bound ranking scores for all non-local sites, then there cannot be any resource at another site with a better score than the top-k matching site resources already determined at the local site. In this case, the local site can return the top-k matching site resources as an answer to the query without forwarding the query to other sites.

On the other hand, if the score of the k-th matching site resource is less than the upper bound ranking score for a non-local site, then there is no guarantee that there are no other resources at other sites that could be a better answer to the query than the top-k matching site resources. In this case, the local site may forward the query to the other non-local sites that have a higher upper bound ranking score than the score of the k-th matching site resource. Upon receiving a forwarded query, the non-local sites evaluate the query using their own local indexes, and each returns a list of results to the local site. The local site then merges all results received from non-local sites including the matching site resources. The local site merges these results according to their ranking scores. The local site returns, to the querier, the best k resources.

The local site may automatically select a value for k based on a variety of factors including query-dependent factors and query-independent factors such as the configured maximum number of search results to display to the querier on a page of search results and/or the number of local site resources that contain the one more search terms.

Approximate Query Answers

In one embodiment, the local site does not forward the received query to a non-local site even though the score of the k-th matching site resource is less than the upper bound ranking score for one or more non-local sites. By refraining from forwarding the query under certain circumstances, the amount of inter-site communication within the search engine is reduced at the expense of the quality of search results returned from the local site. In addition to decreasing inter-site communication, the number of queries processed entirely at each local site increases. Sacrificing search result quality in order to reduce inter-site communication may be acceptable, for example, when the score of the k-th matching site resource is close enough to the upper bound ranking scores of non-local sites when considering the cost of inter-site communication.

In one or more embodiments, the calculated upper bound ranking scores for each non-local site is reduced by a slackness value $\epsilon$ which represents a tradeoff between (a) the quality of search results and (b) the time and communication bandwidth savings gained by answering queries at the local site without having to communicate with other sites. After reducing upper bound ranking scores by $\epsilon$, query processing proceeds as described previously. If the score of the k-th matching site resource is less than an upper bound ranking score for a non-local site (as reduced by $\epsilon$), then the query is forwarded to the non-local site. On the other hand, if the score of the k-th matching site resource is greater than or equal to the upper bound ranking score for a non-local site (as reduced by $\epsilon$), then the top-k matching site resources are considered to be a close enough answer to the query and are returned as search results without communicating with a non-local site.

In one or more embodiments, the value of $\epsilon$ is automatically determined for each non-local site on a query-by-query basis depending on monitoring information that indicates the current cost of communicating with the respective non-local site. In these embodiments, $\epsilon$ reflects the cost of the local site communicating with a non-local site at a given point in time. The cost may be calculated based on a variety of monitoring information about the local site and the non-local site. For example, the monitoring information may include monitoring information about the network link between the local site and the non-local site and monitoring information about the current query load of the non-local site. Sites may exchange monitoring information with each other on a periodic basis. Alternatively, a centralized monitoring system may be employed to collect, periodically, monitoring information about each site and to report, periodically, monitoring information about other sites to each site. With monitoring information about a non-local site available, the local site can automatically determine, when processing a query, a value for $\acute{\epsilon}$ that accurately reflects the tradeoff between (a) sacrificing the quality of search results and (b) saving time and bandwidth by answering queries at the local site without having to communicate with other sites.

Exemplary Method for Query-Processing in a Multi-Site Search Engine

An exemplary method for query processing in a multi-site searching engine according to one or more embodiments of the invention is described below with reference to FIGS. 1, 2A, 2B, 2C, and 2D.

The method begins at step 200 of FIG. 2A during the indexing phase, where each site 102A-N computes threshold ranking scores for all search terms contained in the local site resources assigned to the site. In this example, resource servers 112 reside throughout the world, and each resource server 112 is assigned to the geographically closest site of sites 102A-N. Also, as explained previously, each site 102A-N, to the extent required by the ranking function employed by search engine 100, has exchanged term frequency information about local site resources assigned to each site so that the threshold ranking scores are comparable at each site 102A-N throughout search engine 100.

Figure 2B:
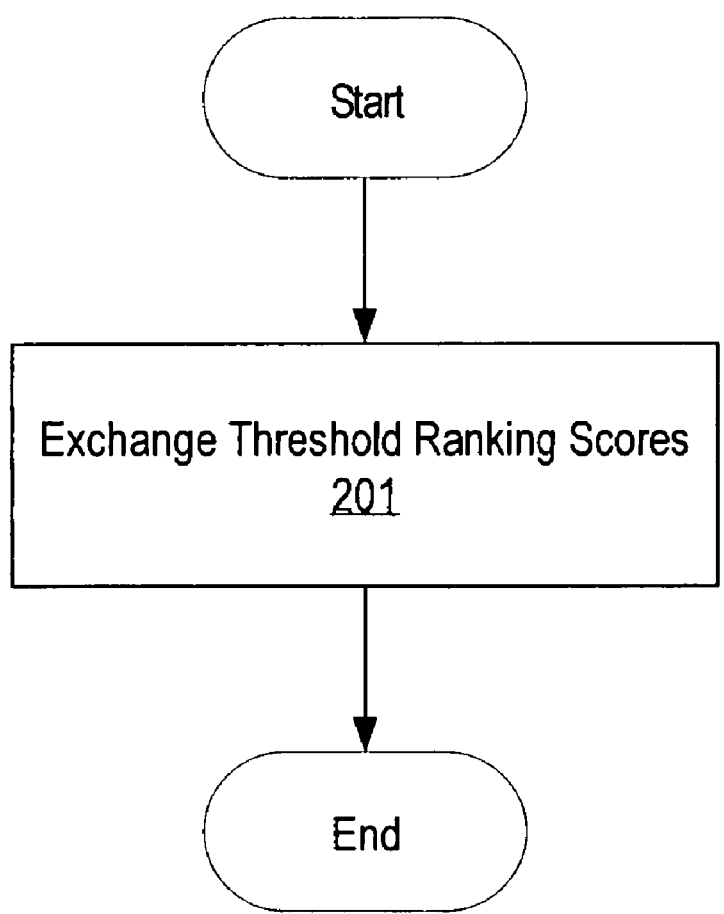
FIG. 2B is a flowchart illustrating exemplary steps for a propagation phase of processing a query in a multi-site search engine according to one or more embodiments of the invention.

In step 201 of FIG. 2B, during the propagation phase, each site 102A-N exchanges threshold ranking scores with each other. As a result, each site acquires complete information about the threshold ranking scores of all the search terms in all the other sites.

The steps of the indexing phase (step 200 of FIG. 2A) and the steps of the propagation phase (step 201 of FIG. 2B) may be performed when search engine 100 and/or any of search sites 102A-N are offline or online.

Figure 2C:
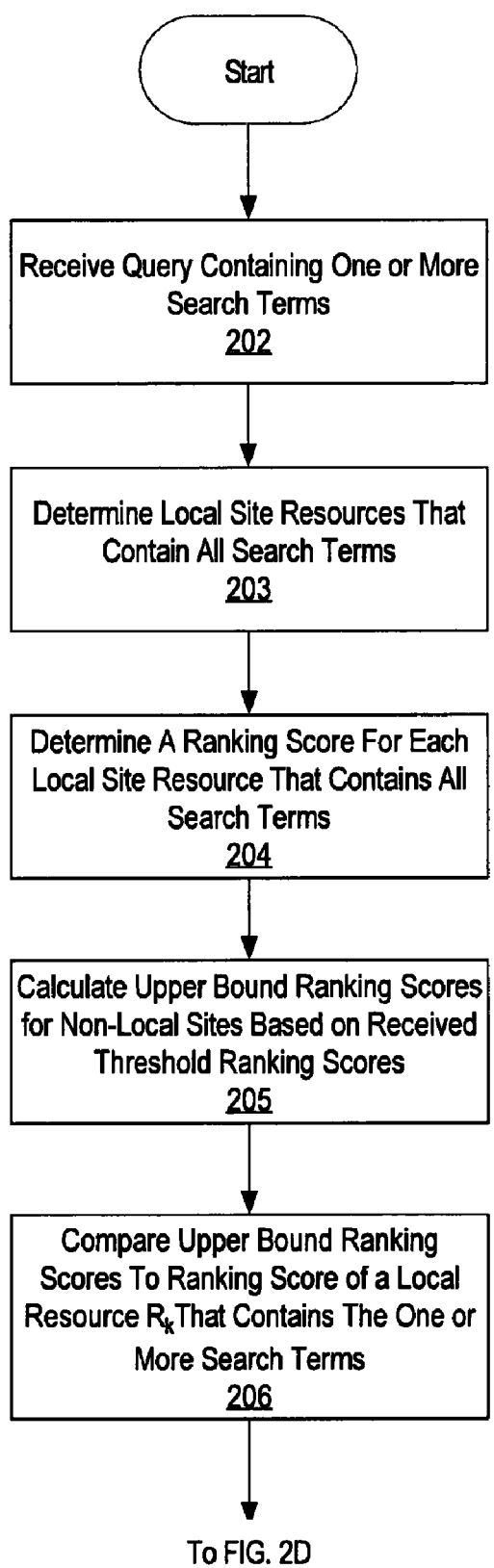
FIGS. 2C and 2D are a flowchart illustrating exemplary steps for a query processing phase of processing a query in a multi-site search engine according to one or more embodiments of the invention.
Figure 2D:
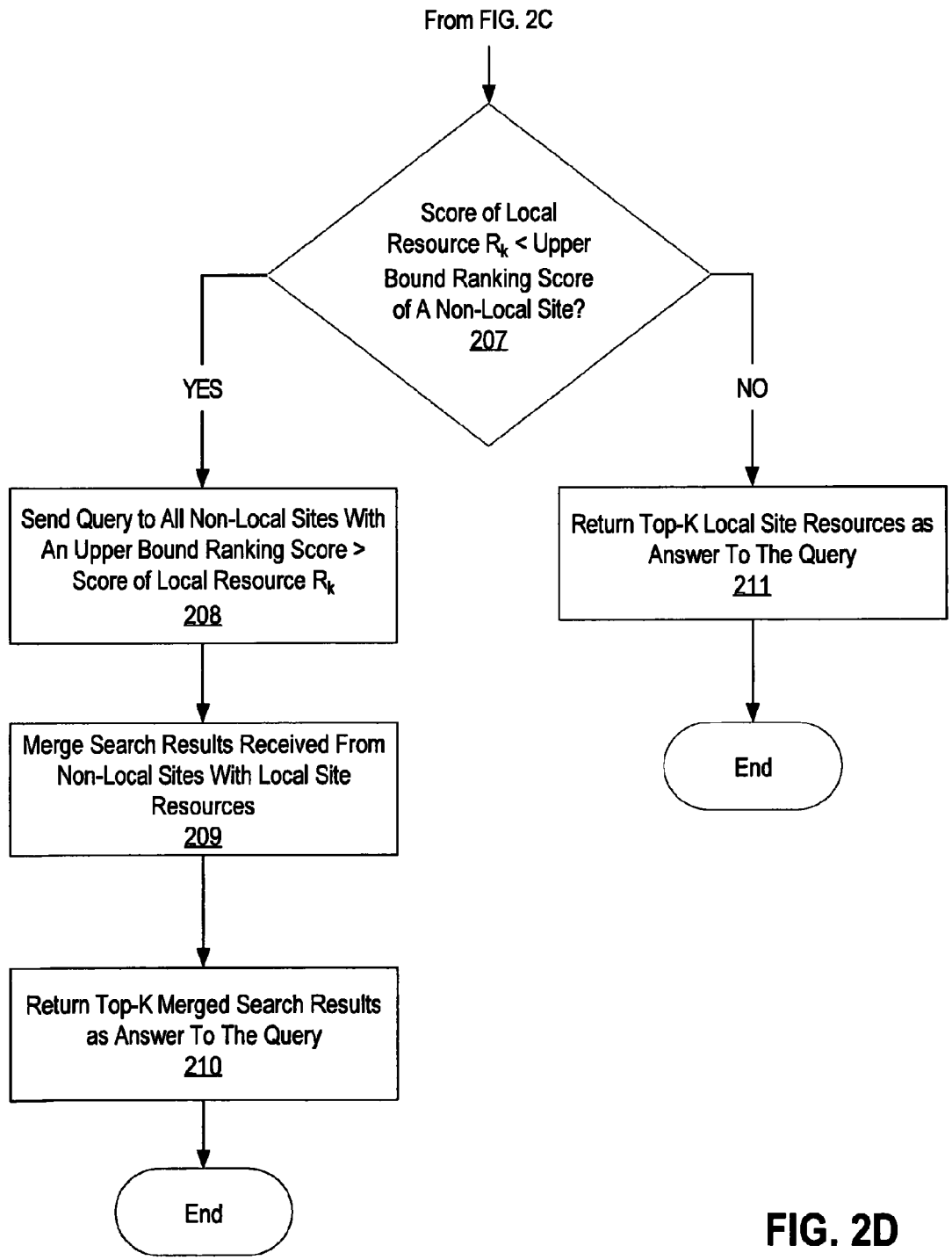

Steps 202 through 206 of FIG. 2C and steps 207-211 of FIG. 2D are performed during the query processing phase. In step 202, a site in search engine 100 (in this example, site 102A) receives a query containing one or more search terms.

In step 203, site 102A determines, based on index entries 104A and 106, a subset of the site resources that contain the one or more search terms of the query.

In step 204, site 102A determines, using the search engine ranking function, a ranking score for each matching site resource in the subset of site resources determined in step 203. Site 102A orders the matching site resources in the subset from highest to lowest based on the resources' ranking scores.

In step 205, site 102A calculates an upper bound ranking score for each non-local site 102B-N based on the threshold ranking scores received from those sites in step 201. In this example, site 102A calculates the upper bound ranking score for each non-local site by computing the average of the threshold ranking scores received from the non-local site for each search term in the search query.

In step 206, local site 102A compares the ranking score of a matching site resource $R_k$ that was determined in step 204 against the upper bound ranking scores determined in step 205 for each non-local site 102B-N.

At decision 207, local site 102A determines whether any of the upper bound ranking scores for the non-local sites 102B-102N is greater than or equal to the ranking score of matching site resource $R_k$. For purposes of explanation, non-local sites 102B and 102C are each assumed to have an upper bound ranking score that is greater than the ranking score of matching site resource $R_k$. In this case, the method proceeds to step 208, in which local site 102A sends the query to sites 102B and 102C. In step 209, after local site 102A receives search results from non-local sites 102B and 102C, local site 102A merges and sorts the non-local and local matching resources according to the resources' respective ranking scores. Finally, in step 210, the top-K local and non-local matching site resources are returned as search results to the query.

On the other hand, if at decision 207, local site 102A determines that there are no non-local sites 102B-102N that have an upper bound ranking score greater than the ranking score of matching site resource $R_k$, then local site 102 returns the top-K locally matching site resources as an answer to the query.

Hardware Overview

Individual clients and/or servers of the multi-site search engine 100 may comprise a conventional or general-purpose computer system, such as an IBM-compatible personal computer (PC) or server computer. FIG. 3 is a very general block diagram that illustrates a computer system 300 in which software-implemented processes of the present invention may be embodied. Computer system 300 includes a bus 302 or other communication mechanism for communicating information, and one or more processors 304 coupled with bus 302 for processing information. Computer system 300 also includes a main memory 306, such as a random access memory (RAM) or other dynamic storage device, coupled to bus 302 for storing information and instructions to be executed by one or more processors 304. Main memory 306 also may be used for storing temporary variables or other intermediate information during execution of instructions to be executed by one or more processors 304. Computer system 300 further includes a read only memory (ROM) 308 or other static storage device coupled to bus 302 for storing static information and instructions for one or more processors 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to one or more processors 304. Another type of user input device is cursor control 316, such as a mouse, a trackball, or cursor direction keys for communicating direction information and command selections to one or more processors 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to one or more processors 304 executing one or more sequences of one or more instructions contained in main memory 306. Such instructions may be read into main memory 306 from another machine-readable medium, such as storage device 310. Execution of the sequences of instructions contained in main memory 306 causes one or more processors 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to one or more processors 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to one or more processors 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which one or more processors 304 retrieves and executes the instructions. The instructions received by main memory 306 may optionally be stored on storage device 310 either before or after execution by one or more processors 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by one or more processors 304 as it is received, and/or stored in storage device 310, or other non-volatile storage for later execution. In this manner, computer system 300 may obtain application code in the form of a carrier wave.

IBM-compatible personal computers and server computers are available from a variety of vendors. Representative vendors include Dell Computer of Round Rock, Tex., Hewlett-Packard of Palo Alto, Calif., and IBM of Armonk, N.Y. Other suitable computers include Apple compatible computers (e.g., Macintosh), which are available from Apple Computer of Cupertino, Calif., and Sun Solaris workstations, which are available from Sun Microsystems of Mountain View, Calif.

Of course, this is just one example of a computing device configuration. In another embodiment, the computing device configuration might be different. In one embodiment, the computing device is a computer system, a personal digital assistant, cell phone, etc.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing a query, comprising:
  in a multi-site search engine comprising a first search site and a second search site, the first search site associated with a first set of resources, the second search site associated with a second set of resources:
  in response to receiving, at the first search site, a query that comprises one or more search terms, the first search site performing operations comprising:

selecting, for inclusion within a subset of the first set of resources, one or more of the first set's resources that contain the one or more search terms;

determining, based on the one or more search terms, a ranking score for each resource in the subset;

determining, based on the one or more search terms, an upper bound ranking score that represents an upper bound on a ranking score of a highest scoring resource that could be an answer to the query at the second search site;

comparing a particular ranking score determined for a particular resource in the subset to the upper bound ranking score;

determining, based on the comparing, whether to send the query to the second search site;

in response to determining, based on the comparing, not to send the query the second search site, sending, to a querier from which the first search site received the query, search results that indicate one or more resources from the subset without sending the query to the second search site;

wherein the method is performed by one or more computing devices.

2. The method of claim 1, wherein the one or more search terms is a plurality of search terms, the method further comprising:

prior to receiving the query, the first search site receiving, from the second search site, a plurality of threshold ranking scores, one for each of the plurality of search terms;

prior to the comparing, the first search site calculating said upper bound ranking score based on the plurality of threshold ranking scores received from the second search site.

3. The method of claim 1, further comprising:

prior to receiving the query, the first search site receiving, from the second search site, first frequency information that indicates, for each of the one or more search terms, a frequency with which the search term appears in the second set of resources and the first search site determining second frequency information that indicates, for each of the one or more search terms, a frequency with which the search term appears in the first set of resources.

4. The method of claim 3, wherein the ranking scores determined for the resources in the subset of the first set of resources are determined based in part on the first frequency information and the second frequency information.

5. The method of claim 3, further comprising:

the first search site sending the second frequency information to the second search site.

6. The method of claim 1, further comprising:

prior to receiving the query from the querier, the first search site determining threshold ranking scores for each of the one or more search terms;

wherein the threshold ranking score for a search term is determined by determining a highest ranking score of a resource in the first set of resources that contains the search term; and the first search site sending the determined threshold ranking scores to the second search site.

7. The method of claim 2, wherein the upper bound ranking score is calculated as an average of the plurality of threshold ranking scores.

8. The method of claim 1, wherein each threshold ranking score of the plurality of threshold ranking scores represents a highest ranking score of a resource in the second set of resources that contains the search term scored by the threshold ranking score.

9. The method of claim 1, wherein no resource in the second set of resources contains all of the one or more search terms.

10. The method of claim 1, wherein at least one of the one or more search terms is not contained in any of the second set of resources.

11. The method of claim 1, wherein the intersection of the first set of resources and the second set of resources comprises a set of globally best resources amongst the first set of resources and the second set of resources.

12. The method of claim 11, wherein the set of globally best resources is determined based on query logs associated with the first search site and the second search site.

13. The method of claim 1, further comprising:

sending search results to the querier that indicate only resources from the subset of the first set of resources.

14. The method of claim 1, wherein the particular ranking score for the particular resource in the subset of the first set of resources is greater than or equal to the upper bound ranking score.

15. The method of claim 1, wherein the particular ranking score for the particular resource in the subset of the first set of resources is less than the upper bound ranking score and determining not to send the query to the second search site is based on monitoring information about the second search site.

16. A computer-readable storage medium storing one or more sequences of instructions which, when executed by one or more processors, causes the one or more processors to perform the method recited in claim 1.

17. A computer-readable storage medium storing one or more sequences of instructions which, when executed by one or more processors, causes the one or more processors to perform the method recited in claim 2.

18. A computer-readable storage medium storing one or more sequences of instructions which, when executed by one or more processors, causes the one or more processors to perform the method recited in claim 3.

19. A computer-readable storage medium storing one or more sequences of instructions which, when executed by one or more processors, causes the one or more processors to perform the method recited in claim 4.

20. A computer-readable storage medium storing one or more sequences of instructions which, when executed by one or more processors, causes the one or more processors to perform the method recited in claim 5.

21. A computer-readable storage medium storing one or more sequences of instructions which, when executed by one or more processors, causes the one or more processors to perform the method recited in claim 6.

22. A computer-readable storage medium storing one or more sequences of instructions which, when executed by one or more processors, causes the one or more processors to perform the method recited in claim 7.

23. A computer-readable storage medium storing one or more sequences of instructions which, when executed by one or more processors, causes the one or more processors to perform the method recited in claim 8.

24. A computer-readable storage medium storing one or more sequences of instructions which, when executed by one or more processors, causes the one or more processors to perform the method recited in claim 9.

25. A computer-readable storage medium storing one or more sequences of instructions which, when executed by one or more processors, causes the one or more processors to perform the method recited in claim 10.

26. A computer-readable storage medium storing one or more sequences of instructions which, when executed by one or more processors, causes the one or more processors to perform the method recited in claim 11.

27. A computer-readable storage medium storing one or more sequences of instructions which, when executed by one or more processors, causes the one or more processors to perform the method recited in claim 12.

28. A computer-readable storage medium storing one or more sequences of instructions which, when executed by one or more processors, causes the one or more processors to perform the method recited in claim 13.

29. A computer-readable storage medium storing one or more sequences of instructions which, when executed by one or more processors, causes the one or more processors to perform the method recited in claim 14.

30. A computer-readable storage medium storing one or more sequences of instructions which, when executed by one or more processors, causes the one or more processors to perform the method recited in claim 15.

31. A system comprising:
   a first set of one or more co-located computing devices;
   a second set of one or more co-located computing devices;
   a first set of resources associated with the first set of computing devices;
   a second set of resources associated with the second set of computing devices;
   the first set of computing devices operable, in response to receiving a query that comprises one or more search terms, to:
      select, for inclusion within a subset of the first set of resources, one or more of the first set's resources that contain the one or more search terms;
      determine, based on the one or more search terms, a ranking score for each resource in the subset;
      determine, based on the one or more search terms, an upper bound ranking score that represents an upper bound on a ranking score of a highest scoring resource that could be an answer to the query if the query were submitted to the second set of computing devices;
      compare a particular ranking score determined for a particular resource in the subset to the upper bound ranking score;
      determine, based on the comparing, whether to send the query to the second set of computing devices;
   the first set of computing devices further operable, in response to determining, based on the comparing, not to send the query the second search site, to send, to a querier from which the first set of computing devices received the query, search results that indicate one or more resources from the subset without sending the query to the second set of computing devices.

* * * * *